(12) United States Patent
Ikenaga (10) Patent No.: US 8,727,578 B2
(45) Date of Patent: May 20, 2014

(54) OPTICAL ELEMENT, METHOD FOR MANUFACTURING OPTICAL ELEMENT, LIGHT EMITTING UNIT, AND METHOD FOR ASSEMBLING LIGHT EMITTING UNIT

(75) Inventor: Shuji Ikenaga, Kashiba (JP)

(73) Assignee: Konica Minolta Opto, Inc., Tokyo (JP)

( * ) Notice: Subject to any disclaimer, the term of this patent is extended or adjusted under 35 U.S.C. 154(b) by 230 days.

(21) Appl. No.: 13/255,584

(22) PCT Filed: Mar. 3, 2010

(86) PCT No.: PCT/JP2010/053415
§ 371 (c)(1), (2), (4) Date: Sep. 9, 2011

(87) PCT Pub. No.: WO2010/103968
PCT Pub. Date: Sep. 16, 2010

(65) Prior Publication Data
US 2011/0317431 A1    Dec. 29, 2011

(30) Foreign Application Priority Data

Mar. 12, 2009 (JP) ................................. 2009-059340
Jul. 21, 2009 (JP) ................................. 2009-169901

(51) Int. Cl.
*F21V 3/00* (2006.01)

(52) U.S. Cl.
USPC ............. 362/311.05; 362/311.04; 362/311.06

(58) Field of Classification Search
USPC ............ 362/311.05, 311.04, 311.06; 359/642
See application file for complete search history.

(56) References Cited

U.S. PATENT DOCUMENTS

2008/0048553 A1    2/2008  Destain et al.
2008/0305939 A1*  12/2008  Oogaki ........................... 501/46

FOREIGN PATENT DOCUMENTS

JP          01-226742       9/1989
JP          03-146427 A     6/1991
WO     WO 2008/016908 A2    2/2008

OTHER PUBLICATIONS

International Search Report in International Application No. PCT/JP2010/053415, mailed Jun. 8, 2010, 2 pages.

* cited by examiner

*Primary Examiner* — Evan Dzierzynski
(74) *Attorney, Agent, or Firm* — Brinks Gilson & Lione (57) ABSTRACT

Provided are an optical element and a method for manufacturing the optical element, wherein the concave optical surface of the optical element does not adhere to the metal mold convex surface and excellent mold releasability is ensured by providing the end surface of the optical element with an end section which is continuous to the outer end section of the concave optical surface of the optical element and providing the end section with a tapered section having a tilt with respect to the flat surface formed by the outer end section of the concave optical surface at the time of forming the optical element by means of a liquid drop method. The tapered section can be used for alignment at the time of assembling the light emitting unit, and contributes to process time reduction and prevention of generation of failures.

13 Claims, 9 Drawing Sheets

OPTICAL ELEMENT, METHOD FOR MANUFACTURING OPTICAL ELEMENT, LIGHT EMITTING UNIT, AND METHOD FOR ASSEMBLING LIGHT EMITTING UNIT

This application is a National Stage of International Application PCT/JP2010/053415 filed with Japanese Patent Office on Mar. 3, 2010.

TECHNICAL FIELD

The present invention relates to an optical element, a method for manufacturing an optical element, a light emitting unit, and a method for assembling a light emitting unit, and particularly relates to an optical element which is formed by compressing a molten glass droplet dispensed on a lower die with the upper die and the lower die, a method for manufacturing an optical unit, a light emitting unit, and a method for assembling a light emitting unit.

BACKGROUND ART

In recent years, manufacturing of lenses by a method (hereinafter, referred to as a liquid droplet method) different form the conventional polishing method has come to be popular, in which droplet method a molten glass droplet dispensed on a lower die is compressed with the upper die and the lower die. Small-diameter lenses and short-focal-length lenses which were conventionally difficult to manufacture have come to be possible to manufacture by use of the liquid droplet method.

For example, a method for manufacturing a non-polished lens by using a liquid droplet method and a manufacturing apparatus are disclosed in patent document 1.

A manufacturing method of an optical element by using a conventional liquid droplet method will be now explained by taking a meniscus lens having a concave surface and a convex surface as an example in reference to FIGS. 6a-6e. FIGS. 6a-6e are schematic drawings to show a manufacturing method of an optical element by using a conventional liquid droplet method.

Figure 6A:
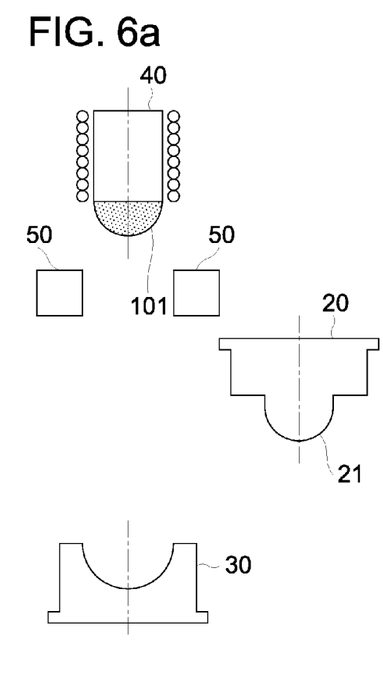
FIGS. 6a-6e are schematic drawings to show a method for manufacturing the optical element according to a conventional liquid droplet method.
Figure 6B:
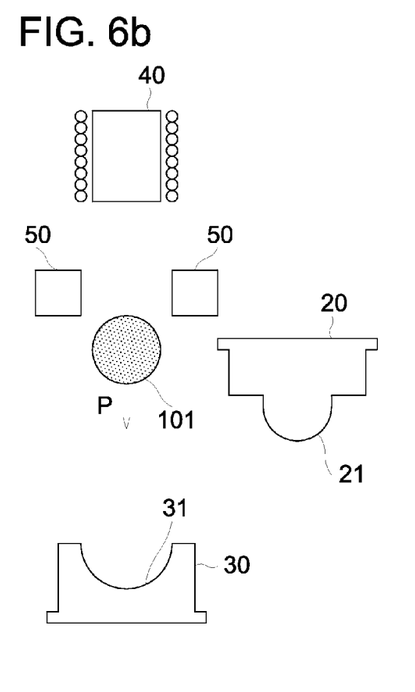

In FIG. 6a, molten glass droplet 101 is formed on the tip portion of nozzle 40 of glass melted in a fusing furnace which is not shown in the drawing. In FIG. 6b, molten glass droplet 101 drops (arrow head P) by its own weight and drops on molding surface 31 (a concave surface in this example) of lower die 30 for molding. The timing of dropping is detected by an optical means or an electric means by use of dropping sensor 50.

Figure 6C:
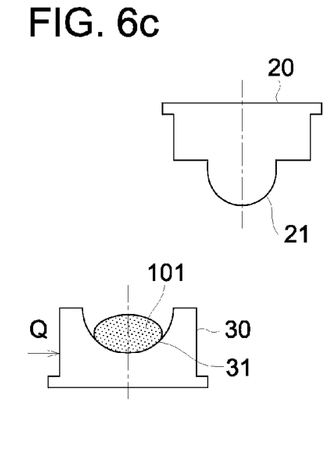
Figures 6D, 6E:
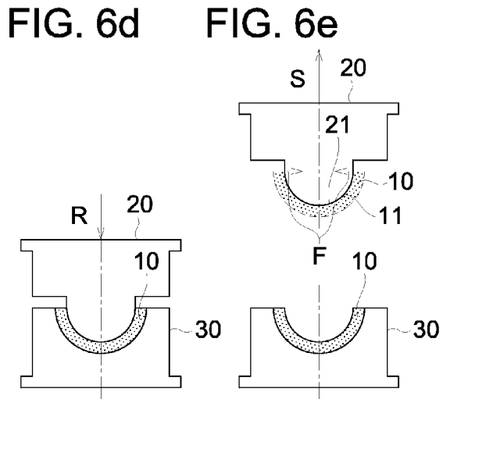

In FIG. 6c, lower die 30, which has the glass droplet 101 on molding surface 31 thereof, is moved (arrow head Q) to direct lower of upper die 20 having molding surface 21 (which is a convex surface in this example), and in FIG. 6d, upper die 20 is downed (arrow head R) to a molding position to perform a press molding after a predetermined time has been elapsed since the molten glass droplet 101 was dropped. After performing press molding for a predetermined time, in FIG. 6e, upper die 20 is lifted (arrow head S) from the molding position to separate upper die 20 and lower die 30 to complete molding of meniscus lens 10.

RELATED ART DOCUMENT

Patent Document

Patent document 1: Japanese Laid-open Patent Application Publication No. H01-226742

SUMMARY OF THE INVENTION

Object of Invention

However, in the case of an optical element, such as the above-described meniscus lens, having a concave surface, if the optical element has a deep concave surface, there may be a problem as follow. The concave surface of the optical element may be stacked to the convex surface of the die after press molding, and may not be separated easily from the die.

For example, in the case of the example of FIGS. 6a-6e, in a liquid droplet method, different from a molding method using a glass preform, since the temperature of molten glass droplet 101 having been dispensed is considerably higher than the temperatures of upper die 20 and lower die 30, and shrinkage of meniscus lens 10 during molding is larger than shrinkage of upper die 20 and lower die 30, a force F in the direction to make meniscus lens 10 wind up on molding surface 21 of upper die 20 is generated. Whereby, as shown by a broken line in FIG. 6e, concave surface 11 of meniscus lens 10 sticks to molding surface 21 (a convex surface) of upper die 20 to make it impossible for meniscus lens 10 to be released from upper die 20.

The present invention has been made in view of the above-described facts and an object of the present invention is to provide an optical element and a method for manufacturing the optical element, wherein the concave surface of an optical element does not stick to the convex surface of a molding die in the case of molding an optical element having a deep concave surface and excellent mold releasability is ensured.

Means to Solve the Problems

An object of the present invention is achieved with the flowing configurations.

Item 1. An optical element made by press molding a molten glass droplet dispensed on a lower die with an upper die and the lower die, the optical element comprising:

at least a concave optical surface; and an end portion continued from an outer edge of the concave optical surface, wherein a tapered portion which is tilted with respect to a flat plane defined by the outer edge of the concave optical surface is provided on the end portion.

Item 2. The optical element of item 1, wherein the tapered portion has an inclination of a taper angle α, on an outer side of the convex optical surface, with respect to the flat plane defined by the outer edge of the concave optical surface, and the taper angle α satisfies the following relationship, $15°≤α≤45°$.

Item 3. The optical element of item 1 or 2, wherein a maximum value of an angle formed by a normal line of the concave optical surface and a direction of a pressure applied between the upper die and the lower die is defined to be a concave surface angle θ, and the concave surface angle θ satisfies the following relationship, $70°≤θ≤90°$.

Item 4. The optical element of any one of items 1 to 3, wherein the tapered portion is provided on a whole circumference of the end portion.

Item 5. The optical element of any one of items 1 to 3, wherein the tapered portion is provided on a part of the edge.

Item 6. The optical element of any one of items 1 to 5, wherein the tapered portion has a width greater than or equal to a half of a thickness of the end portion of the optical element.

Item 7. A method for manufacturing an optical element by press molding a molten glass droplet dispensed on a lower die with an upper die and the lower die, wherein the optical element includes at least a concave optical surface, and the upper die or the lower die having a convex surface for molding the concave optical surface has a tapered portion tilted with respect to a flat plane defined by an outer edge of the convex surface.

Item 8. The method of item 7 for manufacturing an optical element, wherein the tapered portion has an inclination of a taper angle α, on an outer side of the convex optical surface, with respect to the flat plane defined by the outer edge of the concave optical surface, and the taper angle α satisfies the following relationship, $$15° \leq \alpha \leq 45°.$$

Item 9. A light emitting unit, comprising:
an optical element made by press molding a molten glass droplet dispensed on a lower die with an upper die and the lower die, the optical element including:
at least a concave optical surface;
an end portion continued from an outer edge of the concave optical surface; and
a tapered portion which is provided on the end portion and is tilted with respect to a flat plane defined by the outer edge;
a substrate having a positioning portion; and
a light emitting member mounted on the substrate,
wherein the optical element and the substrate are positioned by bringing the positioning portion and the tapered portion of the optical element in contact with each other.

Item 10. The light emitting unit of item 9, wherein the positioning portion is provided on a positioning member which is different from the substrate.

Item 11. The light emitting unit of item 9 or 10, wherein the optical element is fixed by adhesion after the positioning portion and the tapered portion of the optical element are brought in contact with each other.

Item 12. A method for assembling a light emitting unit which includes:
an optical element made by press molding a molten glass droplet dispensed on a lower die with an upper die and the lower die, the optical element having:
at least a concave optical surface;
an end portion continued from an outer edge of the concave optical surface; and
a tapered portion which is provided on the end portion and is tilted with respect to a flat plane defined by the outer edge;
a substrate having a positioning portion; and
a light emitting member mounted on the substrate,
the method comprising the step of:
positioning the optical element and the substrate by bringing the positioning portion and the tapered portion of the optical element in contact with each other.

Item 13. The method of item 12 for assembling a light emitting unit, wherein the positioning portion is provided on a positioning member which is different from the substrate.

Item 14. The method of item 12 or 13 for assembling a light emitting unit, comprising the step of:
an adhesion step in which the optical element is fixed by adhesion after the positioning portion and the tapered portion of the optical element are brought in contact with each other in the step of positioning.

Item 15. An optical element which is positioned on an substrate of a light emitting unit so as to cover a light emitting element, the optical element comprising:

at least a concave optical surface; and
an end portion continued from an outer edge of the concave optical surface, the end portion being provided with a tapered portion which is inclined with respect to a flat plane defined by the outer edge.

Advantages of the Invention

According to the present invention, an optical element and a method for manufacturing the optical element are provided, wherein, when an optical element is manufactured by a liquid droplet method, the concave optical surface of the optical element does not stick to the convex surface of a molding die and excellent mold releasability is ensured by arranging, on the end surface of the optical element, an end portion which is continued from the outer edge of the concave optical surface of the optical element and providing a tapered portion tilted with respect to the flat plane defined by the outer edge of the concave optical surface.

Further, by using the tapered portion provided on an optical element for positioning, the present invention provide a light emitting unit and a method for assembling a light emitting unit, wherein processing time is shortened and poor appearance of scratch due to centering and edging or defects such as crack or chipping are prevented.

Further, by providing at least one convex optical surface and an end portion continued from the outer edge of the convex optical surface to an optical element which covers a light emitting element which is mounted to be positioned on a substrate, and by arranging a tapered portion tilted with respect to the flat plane defined by the outer edge of the concave optical surface, the present invention provides an optical element, wherein the concave optical surface does not stick to the convex surface of the molding die and excellent mold releasability is ensured at the time of molding the optical element.

PREFERRED EMBODIMENT OF THE INVENTION

In the following, the present invention will be explained based on the embodiments shown in the drawings; however, the present invention is not limited to the embodiments. Herein, in the drawings, same reference numerals will be given to the same or equivalent portions and repeated explanation will be omitted.

Figure 1A:
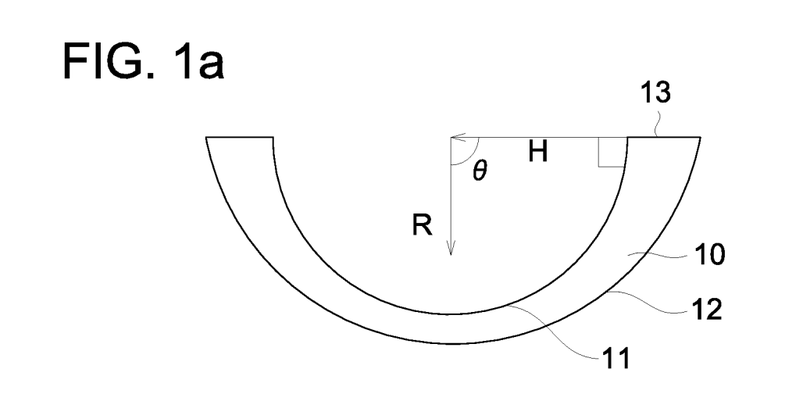
FIGS. 1a, 1b, and 1c are schematic drawings to explain optical elements to which the present invention is to be applied.
Figure 1B:
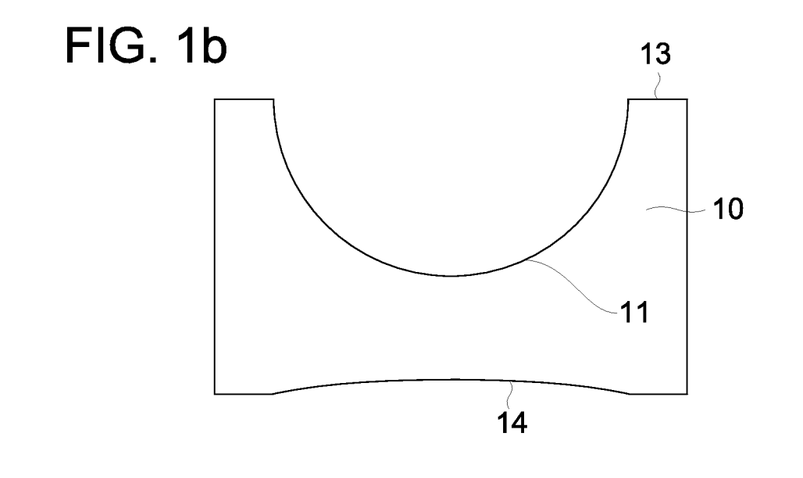
Figure 1C:
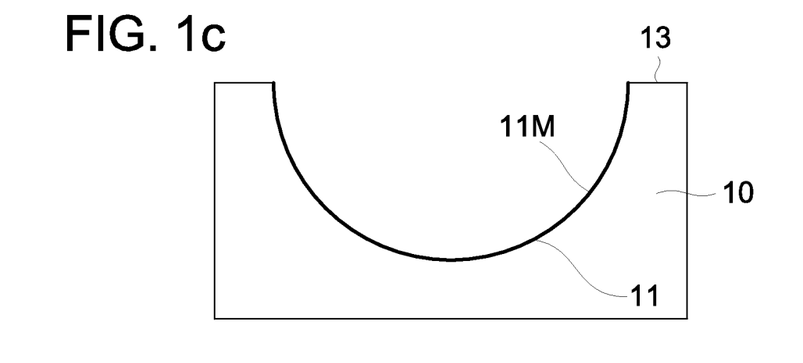

First, an optical element according to the present invention will be explained in reference to FIGS. 1a, 1b, and 1c. FIGS. 1a, 1b, and 1c are schematic drawings to explain optical elements to which the present invention is to be applied.

An optical element to which the present invention is to be applied is an optical element having at least one deep concave surface, and includes optical elements 10 such as meniscus lens 10 constituted of concave surface 11 and convex surface 12 which is exemplified in FIG. 1a, concave lens 10 constituted of concave surface 11 and concave surface 14 which is exemplified in FIG. 1b, and concave mirror 10 having reflective surface 11M comprising concave surface 11 deposited with Al or Ag, which is exemplified in FIG. 1c. Herein, the flat surface section continued from concave surface 11 is defined as end surface 13. Further, concave surface 11 functions as a concave optical surface of the present invention.

The above described concave surface 11, convex surface 12, concave surface 14 and reflective surface 11M are not limited to a spherical surface and may be an aspherical surface or a complex surface comprising a plural number of spherical surfaces or aspherical surfaces.

Further, for example, optical element 10 may be a plano-concave lens in which concave surface 14 of FIG. 1b is replaced by a flat surface without curvature. In short, optical element 10 according to the present invention is at least provided with a deep concave surface 11.

Herein, as a measure of the depth of concave surface 11, as shown in FIG. 1a, the maximum value of an angle between normal line H of concave surface 11 and pressing direction R of press molding with upper die 20 and lower die 30 shown in FIG. 6 is defined as concave surface angle θ. For example, as shown in an example of FIG. 1a, in the case of spherical concave surface 11, concave surface angle θ is the maximum at the boundary portion between concave surface 11 and end surface 13, and θ=90°. The details will be described later; however, the studies of the present inventors show that the present invention is specifically effective in a range of 70°≤θ≤90°.

Figure 2A:
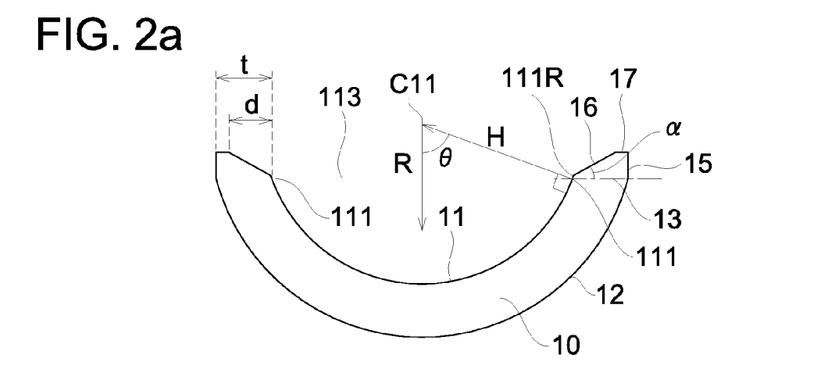
FIGS. 2a, 2b, and 2c are schematic drawings to show the shape of an optical element according to the present invention in a first embodiment.
Figure 2B:
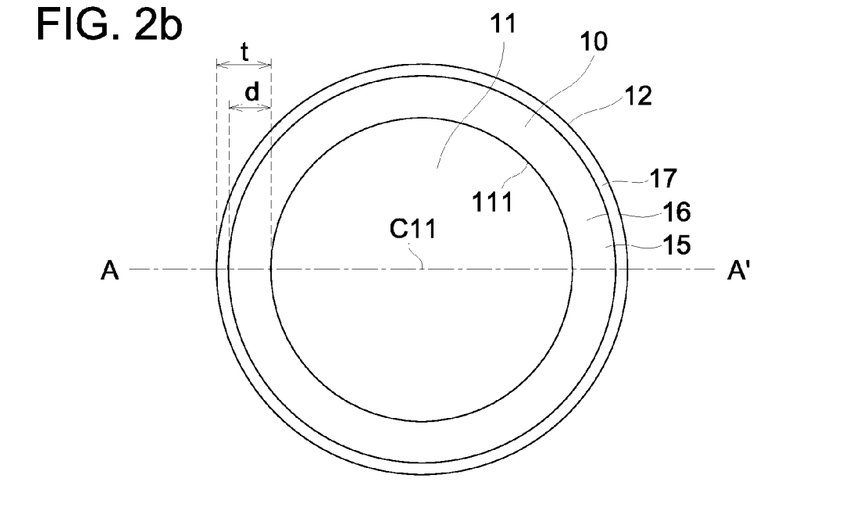
Figure 2C:
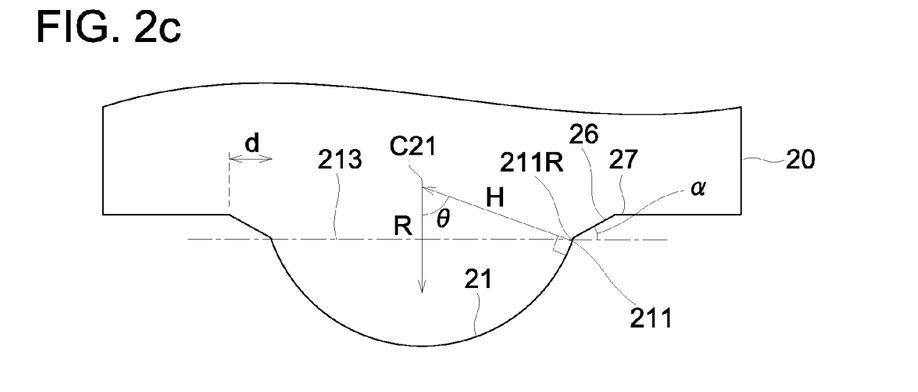

Next, the first embodiment of an optical element according to the present invention will be explained in reference to FIGS. 2a-3b. FIGS. 2a, 2b, and 2c are schematic drawings to show the shape of an optical element of the first embodiment and molding dies according to the present invention. FIG. 2a is a cross-sectional view along A-A' of FIG. 2b showing the shape of an optical element of the first embodiment, FIG. 2b is a top view from the direction of arrow head R of FIG. 2a showing the shape of an optical element of the first embodiment, and FIG. 2c is a cross-sectional view showing the shape of an upper die, corresponding to FIG. 2a, of the first embodiment.

In FIGS. 2a and 2b, optical element 10 is an example of meniscus lens 10 shown in FIG. 1a which has concave surface 11 and convex surface 12, and concave surface angle θ defined in FIG. 1a is 70°.

The whole circumference of end surface 13 of meniscus lens 10 is provided with end portion 15 continued from the outer edge 111 of concave surface 11, and end portion 15 is provided, over the whole circumference, with tapered portion 16 having a predetermined taper angle α (for example α=30°) with respect to flat plane 113 defined by outer edge 111. Herein, the expression that end portion 15 is continued from outer edge 111 refers to not only that outer edge 111 and end portion 11 are directly connected, but that outer edge 111 and the tapered portion 16 of end portion 15 are connected through spherical surface 111R.

Further, on the whole circumference of the outermost circumference of tapered portion 16 of end portion 15, flat portion 17 is provided, which is a meeting surface with upper die 20 parallel to flat plane 113 defined by outer edge 111. Flat portion 17 is not indispensable. Width t of end portion 15 is equal to the width of end portion 13 of meniscus lens 10.

To maintain excellent mold releasability, of a meniscus lens from a molding die, width d of tapered portion 16 is preferably no less than ½ of width t of end portion 15.

In FIG. 2c, only the circumference of molding surface 21 of upper die 20 is shown. In FIG. 2c, upper die 20 is constituted of molding surface 21, tapered portion 26 and flat portion 27. Molding surface 21 and tapered portion 26 are connected through spherical surface 211R having the minimum moldable radius which can be molded.

Tapered portion 26 has a predetermined taper angle α (for example α=30°) with respect to flat plane 213 defined by outer edge 211 of molding surface 21, and width d of tapered portion 26 is preferably no less than ½ of width t of end portion 15 of meniscus lens 10. When width d of tapered portion 26 is no less than ½ of width t of end portion 15, it is possible to maintain excellent mold releasability of meniscus lens 10 from upper die 20.

The maximum value of an angle between normal line H of molding surface 21 and pressing direction R of upper die 20 and lower die 30, that is, concave surface angle θ is 70° in this case.

Figure 3A:
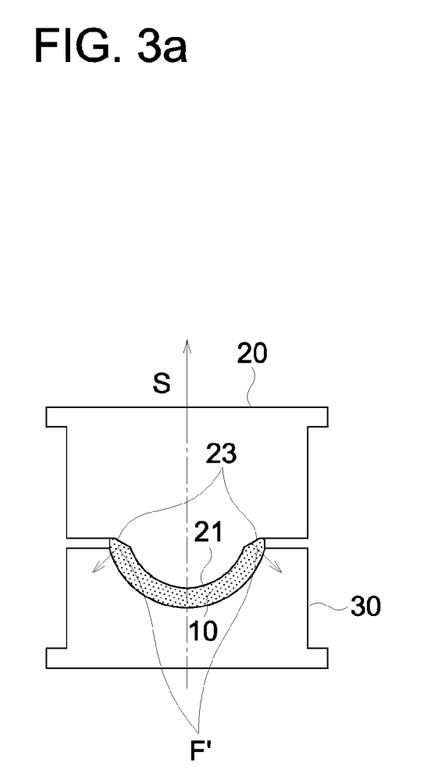
FIGS. 3a and 3b are schematic drawings to show a method for manufacturing the optical element according to the first embodiment.
Figure 3B:
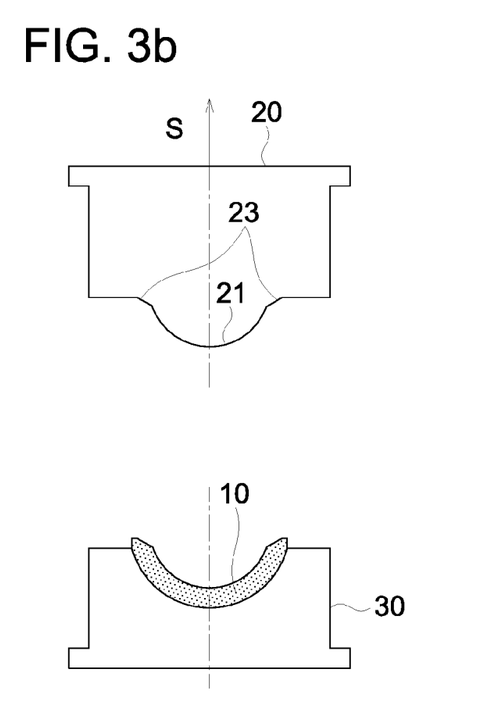

FIGS. 3a and 3b are schematic drawings to show a method for manufacturing the optical element of the first embodiment. FIG. 3a shows the state when separation of upper die 20 and lower die 30 starts after press molding is completed in FIG. 6d. FIG. 3b shows, similarly to FIG. 6e, the state when the upper die and the lower die have been separated.

Differently from the case of FIGS. 6a-6b, by the tapered portion 16 provided on end portion 15 of meniscus lens 10, the force F', which pushes out a lens from molding surface 21 of upper die 20, generates when meniscus lens 10 shrinks after press molded. As a result, as shown in FIG. 3b, meniscus lens 10 remains on lower die 30 without sticking to upper die 20, thereby enabling smooth mold release.

Herein, to secure smooth mold release, the above-described taper angle α is preferably 15°≤α≤45°. Further, as the results of examples which will be described later, this condition is effective in the case of concave surface angle θ in the range of 70°≤θ≤90°.

Herein, molding surface 21 of upper die 20 is a convex surface and molding surface 31 of lower die 30 is a concave surface in this case; however, the opposite case is also possible. Further, as an optical element, a meniscus lens comprising a concave surface and a convex surface was exemplified, however, the optical element may be other examples shown in FIGS. 1a, 1b, and 1c, and the optical element has only to have a deep concave surface.

As described above, according to the first embodiment of an optical element, at the time of molding the optical element according to the liquid droplet method, the end portion is provided, on the whole circumference of the end surface of the optical element, to be continued from the outer edge of the concave optical surface of the optical element; and the tapered portion having a taper angle α with respect to the flat plane defined by the outer edge of the concave optical element is provided on the whole circumference of the end portion. This arrangement provides an optical element and a method for manufacturing the optical element in which the concave optical surface of the optical element does not stick to the convex surface of the die, and excellent mold releasability is thus secured.

Figure 4A:
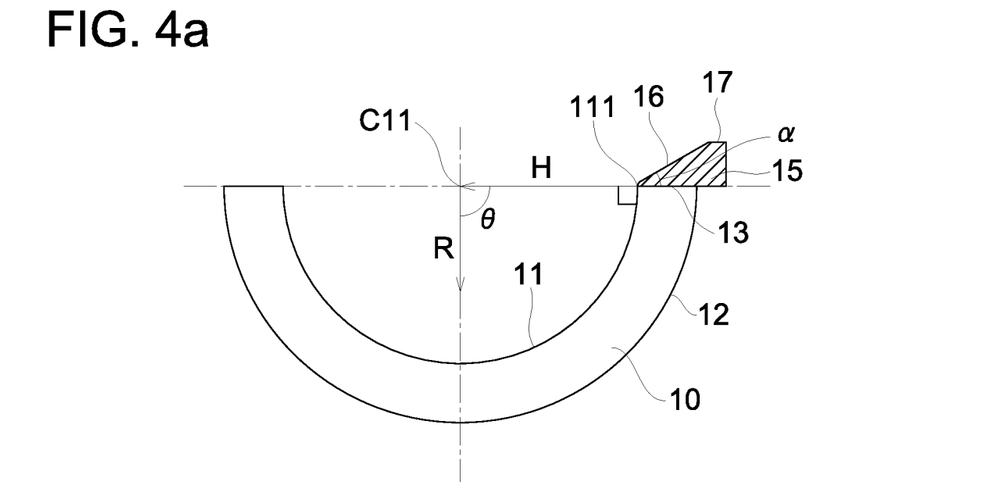
FIGS. 4a and 4b are schematic drawings to show the shape of an optical element according to the present invention in a second embodiment.
Figure 4B:
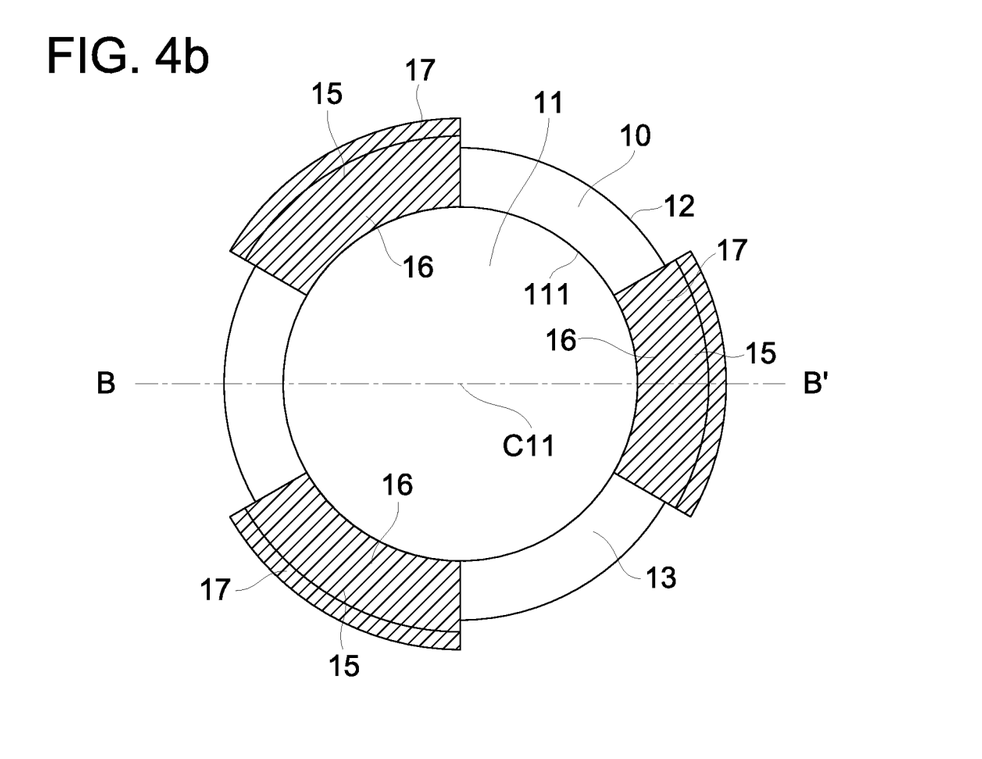

Next, the second embodiment of an optical element according to the present invention will be explained in reference to FIG. 4. FIGS. 4a and 4b are schematic drawings to show the shape of an optical element of the second embodiment according to the present invention. FIG. 4a is a cross-sectional view along B-B' of FIG. 4b showing the shape of the second embodiment, and FIG. 4b is a top view from arrow head R of FIG. 4a showing the shape of the second embodiment The second embodiment is different from the first embodiment in: that end portion 15 is larger than the width of the end surface of meniscus lens 10 and hangs over the side of convex surface 12; that end portion 15 is provided only on the part of end surface 13; and that concave surface angle is θ=90°.

In the example of FIGS. 4a and 4b, end portions 15 are provided at three positions which equally divide end surface 13 into three, in a size of one sixth of end surface 13, and hang over the side of convex surface 12, along end surface 13.

On the other hand, tapered portion 16 and flat portion 17 are provided on end portion 15 similarly to the first embodiment, and tapered portion similarly has an advantage of improving mold releasability.

As described above, according to the second embodiment of an optical element, at the time of molding the optical element according to the liquid droplet method, the end portion is provided, on part of the circumference of the end surface of the optical element, to be continued from the outer edge of the concave optical surface of the optical element; and the tapered portion having a taper angle α with respect to the flat plane defined by the outer edge of the concave optical element is provided on the end portion. This arrangement provides an optical element and a method for manufacturing the optical element in which the concave optical surface of the optical element does not stick to the convex surface of the die, and excellent mold releasability is thus secured.

Figure 7A:
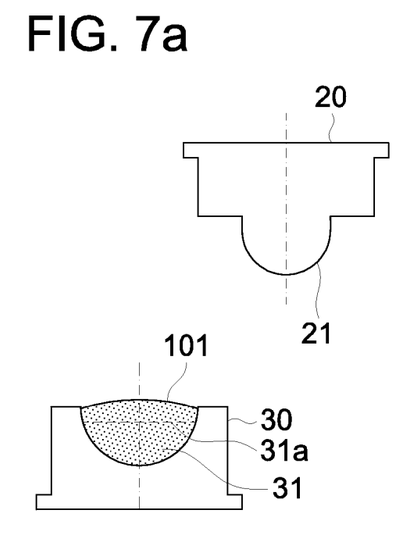
FIGS. 7a, 7b, and 7c are cross-sectional schematic drawings to show a problem of an optical element used for a light emitting unit.
Figure 7B:
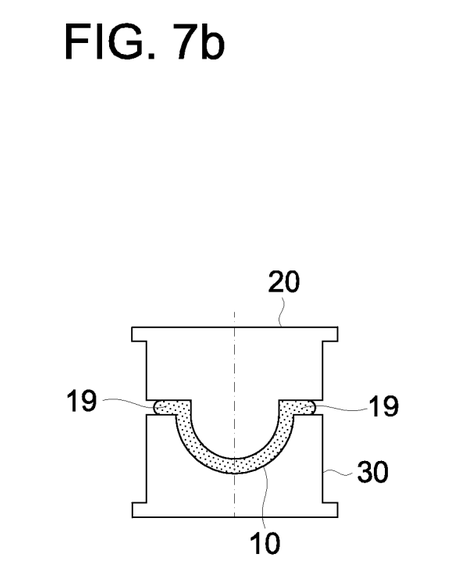
Figure 7C:
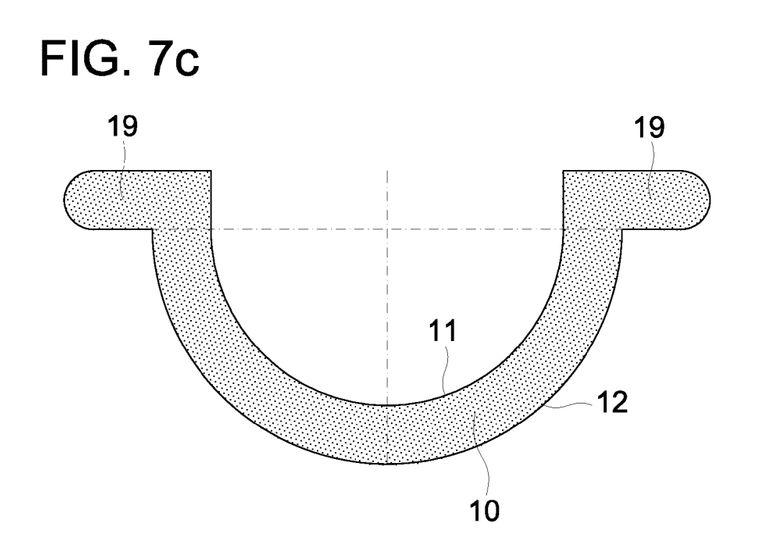
Figure 8A:
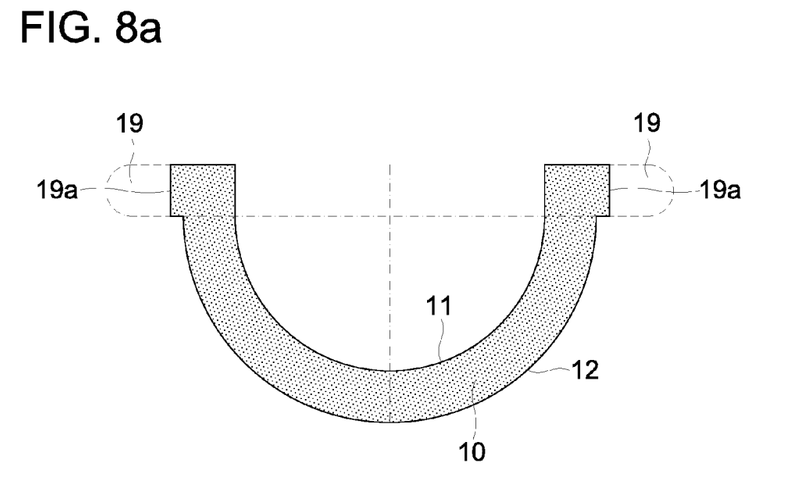
FIGS. 8a and 8b are cross-sectional schematic drawings to show an example of a light emitting unit and a method for assembling the light emitting unit.
Figure 8B:
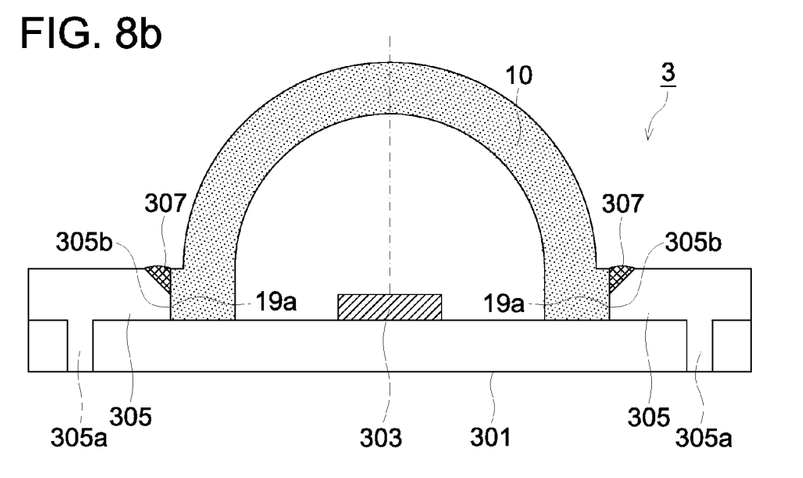
Figure 9A:
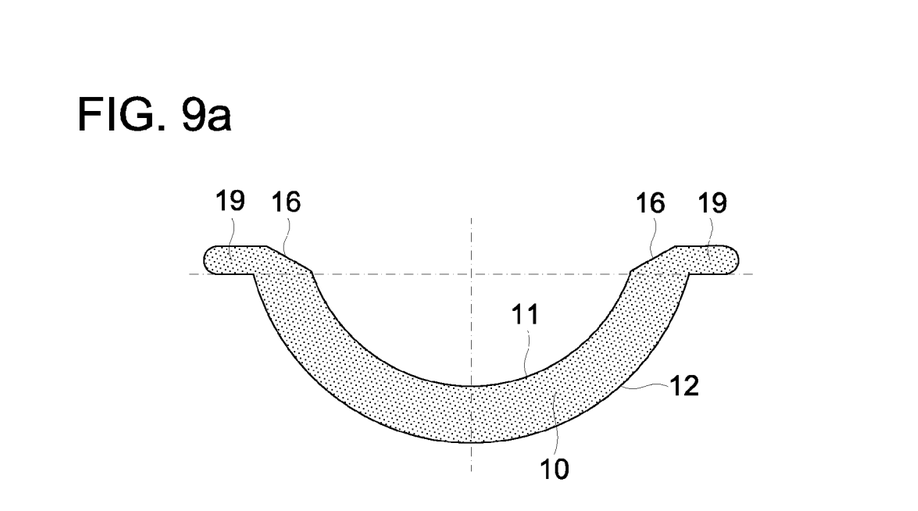
FIGS. 9a and 9b are cross-sectional schematic drawings to show an embodiment of a light emitting unit and a method for assembling a light emitting unit using an optical element according to the present invention.
Figure 9B:
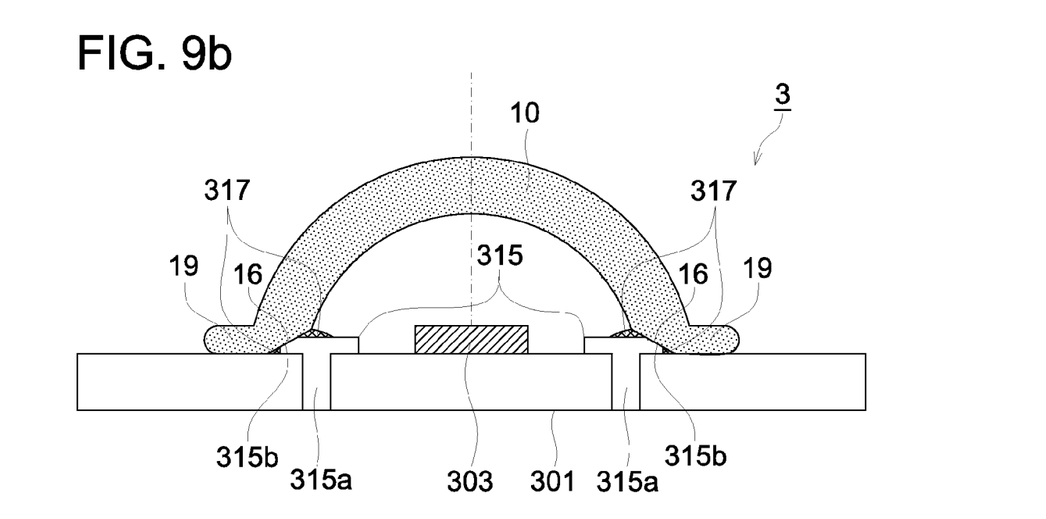

Next, an embodiment of a light emitting unit and a method for manufacturing the light emitting unit using the above-described optical element will be explained in reference to FIGS. 7a-9b. FIGS. 7a, 7b, and 7c are schematic drawings to show problems of an optical element used for a light emitting unit. FIGS. 8a and 8b are schematic drawings to show an example of a light emitting unit and a method for assembling a light emitting unit. FIGS. 9a and 9b are schematic drawings to show an embodiment of a light emitting unit and a method for assembling a light emitting unit using an optical element according to the present invention.

First, a problem of an optical element used for a light emitting unit will be explained. In FIGS. 6a-6e, in order to show that meniscus lens 10 shown in FIG. 6e can be prepared by the liquid droplet method, the figures show that the size of molten glass droplet 101 dispensed as a liquid droplet is not larger than the cavity size of molding surface 31 (a concave surface) of lower die 30.

However, as a matter of fact, it is known that when molten glass droplet 101 is dispensed as a liquid droplet smaller than the cavity of molding surface 31 of lower die 30, streaks will be generated at the position where molten glass droplet 101 and the molding surface of lower die 30 are in contact with each other.

Therefore, it is necessary in a practical press molding by the liquid droplet method to place the molten glass droplet 101 in an amount larger than at least position 31a of molding surface 31 of lower die 30, up to which position a surface shape needs to be secured. In this case, as shown in FIG. 7b, a part of molten glass droplet 101 is pushed out into a gap between upper die 20 and lower die 30 to form flange portion 19 on meniscus lens 10 as shown in FIG. 7c.

Since the size and form of flange portion 19 fluctuates, it is general, as shown in FIGS. 8a and 8b, to perform adjustment of the outer shape by a so-called centering and edging process to eliminate a part of flange portion 19 of meniscus lens 10 by means of polishing or the like. By this centering and edging process, end surface 19a having high dimensional precision is formed.

Light emitting unit 3, as shown in FIG. 8b, is constituted of substrate 301; light emitting element 303 such as a light emitting diode (LED), which is mounted on substrate 301; and meniscus lens 10 which is arranged on substrate 301 so as to cover light emitting element 303. In light emitting unit 3, positioning of light emitting element 303 and the optical axis of meniscus lens 10 are necessary. In this embodiment, an example of the positioning is a method in which end surface 19a having a high dimensional precision which has been formed by the centering and edging process of flange portion 19 of meniscus lens 10 is used for positioning, and end surface 19a is dispensed into the inside of frame member 305 so as to be in contact with end surface 305b of frame member 305.

In a method for assembling light emitting unit 3, first, light emitting element 303 is mounted on substrate 301 by means of die-bonding and wire-bonding. Next, frame member 305 is aligned by inserting projected part 305a into the positioning hole which is formed in substrate 301, and substrate 301 and frame member 305 are fixed by adhesion in this state.

Successively, end surface 19a of meniscus lens 10 is aligned by being dispensed into the inside of frame member 305 so as to be in contact with end surface 305b of frame member 305, and end surface 19a and frame member 305 are fixed with adhesive 307 in this state.

However, the centering and edging process of flange portion 19 of meniscus lens 10, which is shown in FIG. 8a, takes a long time, and in the centering and edging process, centering-and-edging scratch on the optical surface of meniscus lens 10 may be caused due to chucking at the time of the centering and edging process resulting in poor appearance, and because defects such as a crack and a chipping on the optical surface of end surface 19a due to polishing may be generated. Accordingly, the centering and edging process is a main cause of increase in cost.

Therefore, in this embodiment, the above-described problem is solved by leaving flange portion 19 as it is instead of performing the centering and edging process, and by positioning with use of tapered portion 16 arranged on meniscus lens 10.

First, FIG. 9a shows the shape in which flange portion 19 is formed on meniscus lens 10 of the first embodiment which is shown in FIG. 2a. Flange portion 19 is formed on the outer circumference of end portion 15 having tapered portion 16. Further, the configuration of light emitting unit 3 is shown in FIG. 9b.

Light emitting unit 3, similarly to FIG. 8b, is constituted of substrate 301; light emitting element 303 such as a light emitting diode (LED); positioning member 315; and meniscus lens 10. On positioning member 315, positioning portion 315b is provided at the position facing tapered portion 16 of meniscus lens 10. Herein, substrate 301 and positioning member 315 may be integrally formed.

In a method for assembling light emitting unit 3, first, light emitting element 303 is mounted on substrate 301 by means of die-bonding and wire-bonding (a light emitting element mounting process). Next, the projected part 315a of positioning member 315 is inserted into the hole formed in substrate 301 to perform positioning of positioning member 315, and positioning member 315 is adhered on substrate 301 by adhesion in this state (a positioning member mounting process).

Successively, adhesive 317 of such as a UV (ultraviolet ray) curing type is applied to positioning portion 315b of positioning member 315 in advance, and positioning is performed by making positioning portion 315b be in contact with tapered portion 16 (a positioning process). Positioning member 315 and meniscus lens 10 are adhered and fixed by curing adhesive 317 of a UV curing type with radiation of UV light from the outside of meniscus lens 10 (an adhesion process).

Light emitting element 303 can be sealed in the space surrounded by substrate 301 and meniscus lens 10 by coating adhesive 317 over the whole circumference where positioning portion 315b and tapered portion 16 are in contact, which results in improvement of reliability.

Further, other than adhering tapered portion 16 to positioning portion 315b, flange portion 19 and substrate 301 may be adhered. Also in this case, it is possible to seal light emitting element 303 and improve reliability by adhering flange portion 19 and substrate 301 over the whole of their circumferences.

As described above, according to the embodiment of the light emitting unit and the method for assembling the light emitting unit using a light emitting element of the present invention, since the positioning is performed by using tapered portion 16 formed on meniscus lens 10 without performing a centering and edging process of flange portion 19 formed on meniscus lens 10, it is possible to provide a light emitting unit and a method for assembling the light emitting unit wherein processing time is shortened, and poor appearance of scratch caused by centering and edging and defects of crack and chipping are prevented.

As described above, according to the present invention, since the end portion and the tapered portion are provided by using the liquid droplet method such that the end portion is continued from the outer edge of the concave optical surface of the optical element, and the tapered portion is tilted with respect to the flat plane defined by the outer edge of the concave optical surface at the time of molding the optical element, it is possible to provide an optical element and a method for manufacturing the optical element to prevent a concave optical surface from sticking to a concave surface of a molding die, thereby ensuring excellent mold releasability.

Further, since the positioning is performed by using the tapered portion arranged on an optical element, it is possible to provide a light emitting unit and a method for assembling the light emitting unit, wherein processing time is shortened and poor appearance of scratch caused by centering and edging and defects of crack and chipping are prevented.

Further, since at least one concave optical surface and an end portion continued from the outer edge of the concave optical surface are provided on an optical element which is positioned and mounted on a substrate of a light emitting unit, and a tapered portion tilted with respect to the flat plane defined by the concave optical surface is provided on an end portion, it is possible to provide an optical element in which the concave optical surface does not stick to the convex surface of the molding die, thereby ensuring excellent mold releasability Herein, with respect to detailed configurations and detailed motions of each configuration of an optical element, a method for manufacturing the optical element, a light emitting unit and a method for assembling the light emitting unit, according to the present invention, any appropriate amendment are possible within a range of the spirit and scope of the invention.

EXAMPLES

In the following, detailed examples of the first embodiment of an optical element according to the present invention will be explained in reference to FIG. 5; however, the present invention is not limited to these examples. FIGS. 5a, 5b, and 5c are graph to show the state of mold release of examples according to the first embodiment of an optical element and experimental examples.

Herein, in experimental examples D, E and F, similarly to meniscus lens 10 shown in FIG. 1a, end portion 15 has a shape without tapered portion 16 continued from concave surface 11. With respect to the other points, they are similar to meniscus lens 10 of the example of FIGS. 2a, 2b, and 2c.

Next, differences of the effects between the examples and the experimental examples will be explained in reference to FIGS. 5a, 5b, and 5c.

In these examples, the time period between the detection, by dropping sensor 50 shown in FIG. 6b, of the drop of molten glass droplet 101 and the start of press molding shown in FIG. 6d is fixed as T1=3 seconds, and the time period for press molding (hereinafter, referred to as press time) T2 is varied from 0.1 seconds to 5 seconds. Under these conditions, the state of mold release of meniscus lens 10 having been press molded was observed. The shapes of meniscus lens 10 used in the experiment were seven kinds including from A to C and from G to J as for examples and seven kinds including from D to F and from K to N as for experimental examples, to total to 14 kinds. These are shown in table 1 together with the evaluation results which will be described later. Herein, other shapes and materials are common for the examples and the experimental examples.

TABLE 1

|  | Tapered portion 16: | Taper angle α (°) | Concave surface angle θ (°) | Evaluation: |
|---|---|---|---|---|
| Example A | Equipped | 30 | 70 | Very good |
| Example B | Equipped | 30 | 80 | Good |
| Example C | Equipped | 30 | 90 | Good |
| Experimental example D | Not equipped | — | 70 | Good |
| Experimental example E | Not equipped | — | 80 | Good |
| Expiomental example F | Not equipped | — | 90 | Poor |
| Example G | Equipped | 15 | 90 | Good |
| Example H | Equipped | 15 | 70 | Good |
| Example I | Equipped | 45 | 90 | Good |
| Example J | Equipped | 45 | 70 | Good |
| Experimental example K | Equipped | 10 | 90 | Poor |
| Experimental example L | Equipped | 10 | 70 | Good |
| Experimental example M | Equipped | 50 | 90 | Poor |
| Experimental example N | Equipped | 50 | 70 | Good |

Figure 5A:
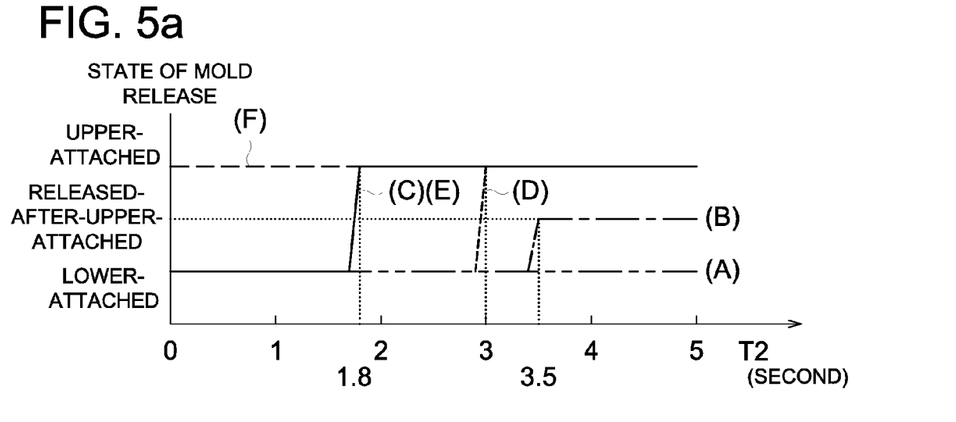
FIGS. 5a, 5b, and 5c are graphs to show the states of mold release in an example of the first embodiment and experimental examples.

As shown in FIG. 5a, with respect to six kinds from Example A to experimental example F, Example A showed an excellent mold releasability in the whole range of press time T2≤5 seconds, and meniscus lens 10 was left in lower die 30 (a lower-attached state). In the experiment, the lower-attached state was obtained even when press time T2 was extended up to 10 seconds, which result was no problem.

In (B), the lower-attached state was realized and excellent mold releasability was exhibited similarly to (A) for press time T2≤3.5 seconds. For the condition of 3.5 seconds≤press time T2≤5 seconds, meniscus lens 10 once stuck to the upper die; however, it was separated from the upper die when the temperature descended (a released-after-upper-attached state). Even in the case of this state, meniscus lens 10 can be corrected, before landing on the lower die, with a receiving mechanism such as a tray; therefore, this mold releasability is no problem.

In (C) and (E), a lower-attached state was realized and excellent mold releasability was exhibited similarly to (B) for the condition of press time T2<1.8 seconds; however, for the condition of 1.8 seconds≤press time T2≤5 seconds, meniscus lens 10 was kept sticking to the upper die (an upper-attached state), and the mold releasability was poor.

In (D), an lower-attached state was realized and excellent mold releasability was exhibited similarly to (A) for the condition of 1 second≤press time T2<3 seconds; however, for the condition of 3 seconds≤press time T2≤5 seconds, meniscus lens 10 was kept sticking to the upper die (an upper-attached state), and the mold releasability was poor.

(F) exhibited the upper-attached state over the whole range of 1 second≤press time T2≤5 seconds, resulting in poor mold releasability.

Figure 5B:
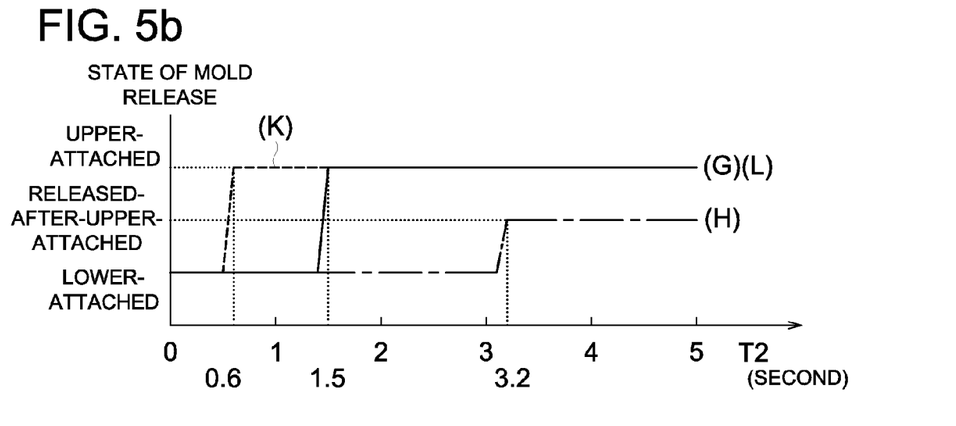

As shown in FIG. 5b, (G) and (L) of the four kinds including Examples G and H and experimental examples K and L exhibited the lower-attached state and an excellent mold releasability for the condition of press time T2<1.5 seconds similarly to (B); however, for the condition of 1.5 seconds≤press time T2≤5 seconds, the lenses were kept sticking to the upper die (an upper-attached state), resulting in poor mold releasability.

(H) exhibited the lower-attached state similarly to (B) and an excellent mold releasability for the condition of press time T2<3.2 seconds. For the condition of 3.2 seconds≤press time T2≤5 seconds, meniscus lens 10 stuck to the upper die at the time of separating the molding dies, and it fell apart from the upper die when the temperature descended (a released-after-upper-attached state). Even in the case of this state, meniscus lens 10 can be corrected, before landing on the lower die, with a receiving mechanism such as a tray; therefore, this mold releasability is no problem.

(K) exhibited the lower-attached state and excellent mold releasability when press time T2<0.6 seconds; however, for the condition of 0.6 seconds≤press time T2≤5 seconds, it kept sticking to the upper die (an upper-attached state) resulting in poor mold releasability.

Figure 5C:
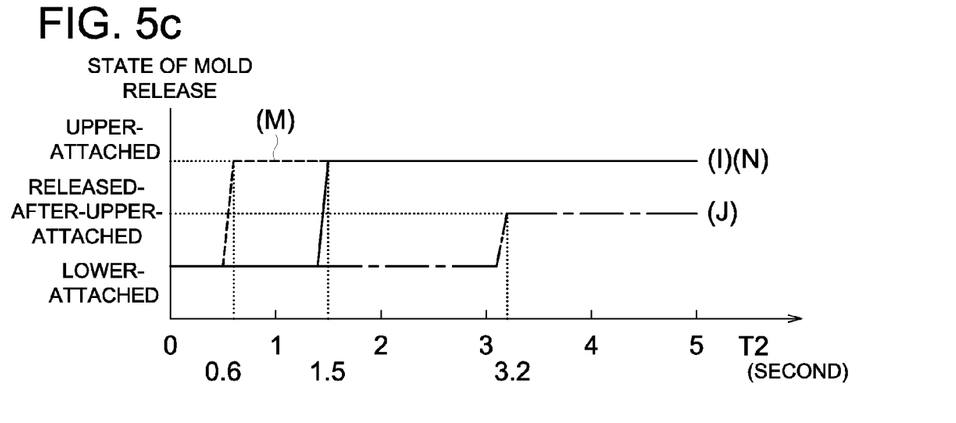

As shown in FIG. 5c, (I) and (N) of four kinds of Examples I and J and experimental examples M and N exhibited an lower-attached state and an excellent mold releasability for the condition of press time T2<1.5 seconds similarly to (B); however, for the condition of 1.5 seconds≤press time T2≤5 seconds, they kept sticking to the upper die (an upper-attached state) resulting in poor mold releasability.

(J) exhibited an lower-attached state and an excellent mold releasability when press time T2<3.2 seconds similarly to (B). For the condition of 3.2 seconds≤press time T2≤5 seconds, meniscus lens 10 once stuck to the upper die; however, it was separated from the upper die when the temperature descended (a released-after-upper-attached state). Even in the case of this state, meniscus lens 10 can be corrected, before landing on the lower die, with a receiving mechanism such as a tray; therefore, this mold releasability is no problem.

(M) exhibited an lower-attached state and an excellent mold releasability for the condition of press time T2<0.6 seconds to exhibit; however, for the condition of 0.6 seconds≤press time T2≤5 seconds, it kept sticking to the upper die (an upper attached state) resulting in poor mold releasability.

Judging from molding conditions, it is possible to realize a stable molding condition for press time T2 not less than 1 second; however, for press time T2 less than 1 second, there is anxiety in molding stability in the case of repeated molding. Therefore, press time T2=1 second was set as a judgment condition and the cases in which there is an lower-attached state at press time T2 not less than 1 second are ranked good and the cases in which there is no lower-attached state at press time T2 not less than 1 second are ranked poor.

As a result, all of examples were ranked to be good. Herein, since a very good result was obtained with respect to example (A), it was ranked to be very good. As for experimental examples, (D), (E), (L) and (N) were ranked to be good and (F), (K) and (M) were ranked to be poor.

On the other hand, with respect to Examples A-C and Experimental Examples D-F, which are shown in FIG. 5a, when (A) is compared with (D), (B) with (E), and (C) with (F), it has come to be clear that examples having tapered portion 16 exhibit good mold releasability over a wider range of press time T2 compared to experimental examples without tapered portion 16 even for the same concave surface angle θ.

Further, for example, when (C) and (E) are compared, it has been proved that (C) exhibits excellent mold releasability for a range of the same press time as (E) because of (C) having tapered portion 16 in spite of the fact that (C) has larger concave surface angle θ.

That shows the fact that by having tapered portion 16 similarly to the examples, the range of press time T2 for exhibiting an excellent mold releasability is broadened with respect to the same concave surface angle θ, and the range of concave surface angle θ for exhibiting good mold releasability is broadened for the same range of press time T2.

Further, when Examples (G) and (H) are compared with experimental examples (K) and (L) which are shown in FIG. 5b, it is shown that while the evaluation results of (G) and (H) both having taper angle α=15° are good even for a deep concave surface having concave surface angle θ of from 70° to 90°, the evaluation result of (K) of (K) and (L) both having taper angle α=10° is poor for concave angle θ=90°.

Similarly, when Examples (I) and (J) are compared with experimental examples (M) and (N) which are shown in FIG. 5c, while the evaluation results of (I) and (J) both having taper angle α=45° are good even for a deep concave surface having concave surface angle θ from 70° to 90°, the evaluation result of (M) of (M) and (N) both having taper angle α=50° is poor for concave angle θ=90°.

From these results, it has been proved that the range for exhibiting an excellent mold releasability even for a deep concave surface having concave surface angle θ from 70° to 90° is 15°≤α≤45°.

DESCRIPTION OF THE NUMERALS

10 Optical element (meniscus lens, concave lens, concave mirror)
11 Concave surface
11M Reflective surface
111 Outer edge (of concave surface 11)
111R Spherical surface 113 Flat plane
12 Convex surface
13 End surface
14 Concave surface
15 End portion
16 Tapered portion
17 Flat portion
20 Upper die
21 Molding surface
211 Outer edge (of molding surface 21)
211R Spherical surface
213 Flat plane
26 Tapered portion
27 Flat portion
30 Lower die
31 Molding surface
40 Nozzle
50 Dropping sensor
101 Molten glass droplet
t Width (of end surface 13)
d Width (of tapered portion 16)
T1 Press timing
T2 Press time
α Taper angle
θ Concave surface angle
3 Light emitting unit
19 Flange portion
19a End surface
301 Substrate
303 Light emitting element
305 Frame member
305a Projected part
305b End surface
307 Adhesive
315 Positioning member
315a Projected part
315b Positioning portion
317 Adhesive

The invention claimed is:

1. An optical element made by press molding a molten glass droplet dispensed on a lower die with an upper die and the lower die, the optical element comprising:
at least a concave optical surface; and
an end portion continued from an outer edge of the concave optical surface, wherein a tapered portion which is tilted with respect to a flat plane defined by the outer edge of the concave optical surface is provided on only a part of the end portion, wherein the tapered portion has an inclination of a taper angle α, on an outer side of the convex optical surface, with respect to the flat plane defined by the outer edge of the concave optical surface, and the taper angle α satisfies the following relationship, $15° \leq \alpha \leq 45°$.

2. The optical element of claim 1, wherein the end portion comprises a flat portion other than the tapered portion, wherein the flat portion is formed on a whole circumference, in a circumferential direction, of the end portion and is parallel to the flat plane defined by the outer edge of the concave optical surface.

3. An optical element made by press molding a molten glass droplet dispensed on a lower die with an upper die and the lower die, the optical element comprising:
at least a concave optical surface; and
an end portion continued from an outer edge of the concave optical surface, wherein a tapered portion which is tilted with respect to a flat plane defined by the outer edge of the concave optical surface is provided on only a part of the end portion, wherein a maximum value of an angle formed by a normal line of the concave optical surface and a direction of a pressure applied between the upper die and the lower die is defined to be a concave surface angle θ, and the concave surface angle θ satisfies the following relationship, $70° \leq \theta \leq 90°$.

4. The optical element of claim 3, wherein the end portion comprises a flat portion other than the tapered portion, wherein the flat portion is formed on a whole circumference, in a circumferential direction, of the end portion and is parallel to the flat plane defined by the outer edge of the concave optical surface.

5. An optical element made by press molding a molten glass droplet dispensed on a lower die with an upper die and the lower die, the optical element comprising:
at least a concave optical surface; and
an end portion continued from an outer edge of the concave optical surface, wherein a tapered portion which is tilted with respect to a flat plane defined by the outer edge of the concave optical surface is provided on only a part of the end portion, wherein the tapered portion has a width greater than or equal to a half of a thickness of the end portion of the optical element.

6. The optical element of claim 5, wherein the end portion comprises a flat portion other than the tapered portion, wherein the flat portion is formed on a whole circumference, in a circumferential direction, of the end portion and is parallel to the flat plane defined by the outer edge of the concave optical surface.

7. A method for manufacturing an optical element having at least a concave optical surface, the method comprising the steps of:
dispensing a molten glass droplet on a lower die; and press molding the droplet with an upper die and the lower die, wherein the upper die includes: a convex surface for molding the concave optical surface; and a tapered portion which is continued from only a part of an outer edge of the convex surface and is tilted with respect to a flat plane defined by the outer edge of the convex surface, wherein the tapered portion has an inclination of a taper angle α, on an outer side of the convex optical surface, with respect to the flat plane defined by the outer edge of the concave optical surface, and the taper angle α satisfies the following relationship, $15° \leq \alpha \leq 45°$.

8. A light emitting unit, comprising:
an optical element made by press molding a molten glass droplet dispensed on a lower die with an upper die and the lower die, the optical element comprising:
a concave optical surface;
an end portion continued from an outer edge of the concave optical surface; and
a tapered portion which is provided on only a part of the end portion and is tilted with respect to a flat plane defined by the outer edge;
a substrate having a positioning portion which is configured to position the substrate and the optical element when being in contact with the tapered portion; and
a light emitting member mounted on the substrate.

9. The light emitting unit of claim 8, comprising:
a positioning member which is different from the substrate and on which the positioning portion is provided.

10. The light emitting unit of claim 9, wherein the optical element is fixed to the positioning member with adhesive.

11. A method for assembling a light emitting unit which comprises:

an optical element made by press molding a molten glass droplet dispensed on a lower die with an upper die and the lower die, the optical element comprising:
a concave optical surface;
an end portion continued from an outer edge of the concave optical surface; and
a tapered portion which is provided on only a part of the end portion and is tilted with respect to a flat plane defined by the outer edge;
a substrate having a positioning portion; and
a light emitting member mounted on the substrate, the method comprising: positioning the optical element and the substrate by bringing the positioning portion and the tapered portion of the optical element in contact with each other.

12. The method of claim 11, wherein the light emitting unit includes a positioning member which is different from the substrate and on which the positioning portion is provided.

13. The method of claim 12, comprising: fixing the optical element to the positioning member with adhesive after the positioning.

\* \* \* \* \*